US006903162B2

(12) United States Patent
Nygard et al.

(10) Patent No.: US 6,903,162 B2
(45) Date of Patent: Jun. 7, 2005

(54) PREPARATION OF POLYETHYLENE FILMS

(75) Inventors: Paula L. Nygard, Bay City, TX (US); Donnie W. Jordy, Lake Jackson, TX (US); Travis W. Knight, West Columbia, TX (US); Dale A. Vedder, Manlius, NY (US)

(73) Assignee: Equistar Chemicals, LP, Houston, TX (US)

( * ) Notice: Subject to any disclaimer, the term of this patent is extended or adjusted under 35 U.S.C. 154(b) by 98 days.

(21) Appl. No.: 10/611,828

(22) Filed: Jul. 1, 2003

(65) Prior Publication Data

US 2005/0003175 A1 Jan. 6, 2005

(51) Int. Cl.[7] .......................... C08F 8/00; C08L 23/00; C08L 23/04; B29C 47/00; D01D 5/24

(52) U.S. Cl. .................... 525/191; 525/240; 264/176.1; 264/177.1; 264/209.1; 264/331.15; 264/331.17

(58) Field of Search ................................ 525/191, 240; 264/176.1, 177.1, 209.1, 331.15, 331.17

(56) References Cited

U.S. PATENT DOCUMENTS

| | | | |
|---|---|---|---|
| 4,086,204 A | 4/1978 | Cassandrini et al. | |
| 4,331,586 A | 5/1982 | Hardy | 525/186 |
| 4,464,518 A | 8/1984 | Iwabuchi et al. | 526/127 |
| 4,812,500 A | 3/1989 | Hayden | 524/99 |
| 5,962,598 A | 10/1999 | Mack et al. | 525/333.8 |
| 6,171,993 B1 | 1/2001 | Mavridis et al. | 502/103 |
| 6,355,733 B1 * | 3/2002 | Williams et al. | 525/191 |
| 6,613,841 B2 * | 9/2003 | Williams | 525/191 |

FOREIGN PATENT DOCUMENTS

| | | |
|---|---|---|
| DE | A-3335718 | 10/1983 |
| EP | A-55158935 | 12/1980 |

* cited by examiner

*Primary Examiner*—Nathan M. Nutter
(74) *Attorney, Agent, or Firm*—Shao-Hua Guo

(57) ABSTRACT

A process for preparing polyethylene thin films is disclosed. The process comprises extruding a blend that comprises a linear low density polyethylene (LLDPE) and a high molecular weight, high density polyethylene (HMW-HDPE) or high molecular weight, medium density polyethylene (HMW-MDPE). The blend has an LLDPE/HMW-HDPE or HMW-MDPE weight ratio at least 50/50. The blend is extruded through an annular die to form a molten material tube. The molten material tube is then pulled around a flexible internal orientation device (FIOD) to form the film. The FIOD makes it possible to prepare polyethylene thin films from LLDPE-rich LLDPE/HMW-HDPE or HMW-MDPE blends on a high stalk film line. The films have increased machine-direction (MD) tears.

10 Claims, 1 Drawing Sheet

PREPARATION OF POLYETHYLENE FILMS

FIELD OF THE INVENTION

The invention relates to the preparation of polyethylene thin films. More particularly, the invention relates to the preparation of polyethylene thin films from a blend comprising a linear low-density polyethylene (LLDPE) with a high molecular weight, high-density polyethylene (HMW-HDPE) or high molecular weight, medium-density polyethylene (HMW-MDPE).

BACKGROUND OF THE INVENTION

Polyethylene is divided into high-density (HDPE, density 0.94 g/cc or greater), medium-density (MDPE, density from 0.93 to 0.94 g/cc), low-density (LDPE, density from 0.91 to 0.93 g/cc), and linear low density polyethylene (LLDPE, density from 0.91 to 0.93 g/cc). See ASTM D4976-98: Standard Specification for Polyethylene Plastic Molding and Extrusion Materials. One of the main uses of polyethylene (HDPE, LLDPE, and LDPE) is in film applications, such as grocery sacks, institutional and consumer can liners, merchandise bags, shipping sacks, food packaging films, multi-wall bag liners, produce bags, deli wrap, stretch wrap and shrink wrap. The key physical parameters of polyethylene film include tear strength, impact strength, tensile strength, stiffness and clarity. Tear strength is measured in machine direction (MD) and transverse direction (TD).

LLDPE film has higher impact strength and MD tear, while HDPE has higher stiffness and tensile strength. When LLDPE producers attempt to increase the density (thereby increasing the modulus of the film), they often encounter losses in impact strength and MD tear. Historically, blending LLDPE and HDPE has not achieved "breakthrough" success. The blends often give films that have improved stiffness and tensile properties, but the impact and tear properties are usually sacrificed. Most LLDPE resins are processed on conventional extruders with dual lip air rings and run "in the pocket" or with no or small stalks, while HMW-HDPE or HMW-MDPE is processed on extruders equipped with a single lip air ring and run with neck heights between 6 and 10 times the die diameter. LLDPE-rich blends are difficult to process on HDPE film extruders in high stalk applications due to their poor bubble stability.

It would be desirable to prepare polyethylene thin films from LLDPE-rich blends comprising LLDPE and HMW-HDPE or HMW-MDPE. Ideally, the blends could be processed on a single lip air ring at a neck height of 6 to 10 die diameters. More particularly, the film would have increased tear strength.

SUMMARY OF THE INVENTION

The invention is a process for preparing polyethylene thin films on a high stalk line. The process comprises extruding a blend that comprises a linear low density polyethylene (LLDPE) and a high molecular weight polyethylene selected from a high molecular weight, high-density polyethylene (HMW-HDPE) or high molecular weight, medium density polyethylene (HMW-MDPE). The blend has an LLDPE/HMW-HDPE or LLDPE/HMW-MDPE weight ratio at least 50/50.

The blend is extruded through an annular die to form a molten material tube. The molten material tube is then pulled around a flexible internal orientation device (FIOD) to form the film. The FIOD (see FIG. 1) is a device installed on the die of a high-stalk blown film line. It provides a means for allowing decreased gauge of polyethylene films. The FIOD makes it possible to prepare thin (less than 1 mil) polyethylene films from the LLDPE-rich blends. The film has increased tear strength.

DETAILED DESCRIPTION OF THE INVENTION

Figure 1:
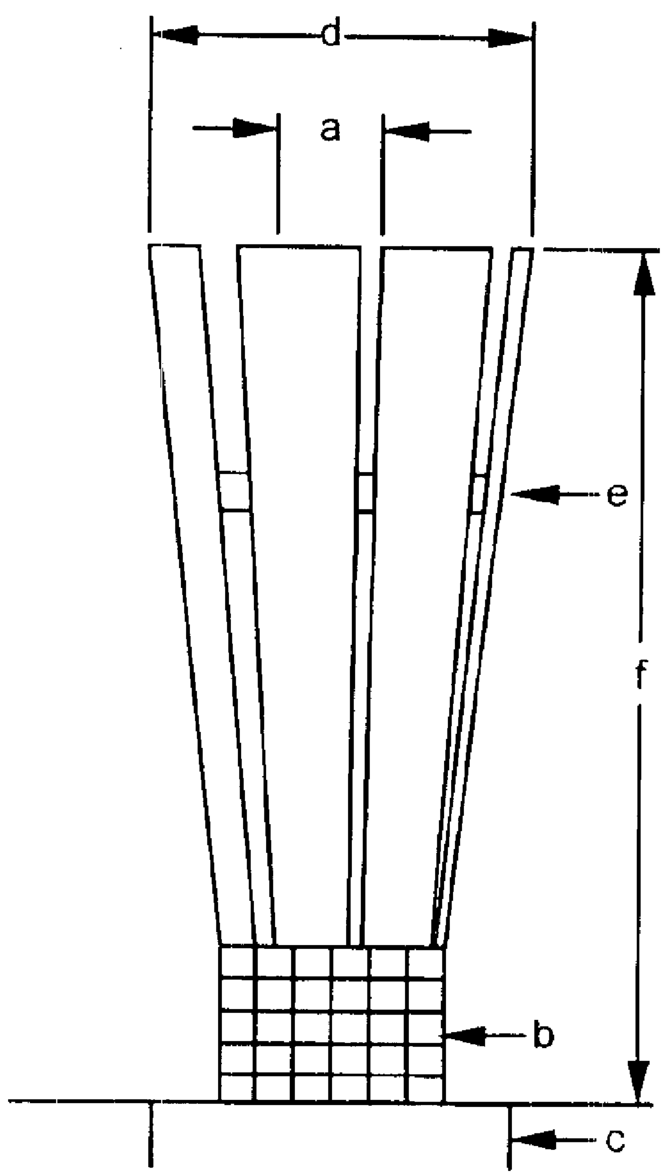
FIG. 1 illustrates FIOD (Flexible Internal Orientation Device).

The invention is a polyethylene thin film production process. The process comprises extruding a blend of a linear low density polyethylene (LLDPE) and a high molecular weight polyethylene selected from a high molecular weight, high density polyethylene (HMW-HDPE) or high molecular weight, medium density polyethylene (HMW-MDPE) through an annular die to form a molten material tube and pulling the molten material tube around a flexible internal orientation device (FIOD) to form the film.

The FIOD (see FIG. 1) is a device installed on the die of a high-stalk blown film line. It is cone shaped with an exterior of slatted pieces that are cored in the center for mounting to a central shaft (FIG. 1(*a*)). This shaft is male threaded and screwed on the receiver threaded piece (FIG. 1(*b*)) that is bolted through the lifting bolt holes on an extruder's annular die (FIG. 1(*c*)). Adjustments to manipulate the upper diameter of the slatted cone (FIG. 1(*d*)) are accomplished by adjusting a plate (FIG. 1(*e*)) higher or lower on the central shaft while holding the device at the same shaft height.

The two key dimensions for the FIOD are the upper diameter (FIG. 2(*d*)) and the distance from the die surface to the top of the device (FIG. 1(*f*)). The diameter of the upper section is adjusted to maintain contact with the molten tube. This diameter is preferably set to be 15–50% larger than the neck diameter of the film stalk. The distance from the die to the top of the FIOD should be as short as possible. Preferably, the distance is about 1–3 times of the die diameter.

As the molten polymer exits the die of the extruder, it is drawn upwards by the primary pull rollers and flared outwards over the FIOD. The FIOD makes it possible to prepare polyethylene thin films from LLDPE-rich LLDPE/HMW-HDPE blends or LLDPE/HMW-MDPE blends.

Ziegler catalysts or newly developed single-site catalysts can produce LLDPE suitable for the use in the invention. Ziegler catalysts are well known. Examples of suitable Ziegler catalysts for making LLDPE include titanium halides, titanium alkoxides, vanadium halides, and mixtures thereof. Ziegler catalysts are used with cocatalysts such as alkyl aluminum compounds.

LLDPE resins are usually copolymers of ethylene with 5 to 15 wt % of a long chain α-olefin such as 1-butene, 1-hexene, and 1-octene. Higher puncture resistance and tear strength are typical of LLDPE films. Great impact resistance and tear strength can be achieved by using 1-octene as the comonomer. Conventional 1-hexene based LLDPE is inferior to that made with 1-octene. However, higher performance 1-hexene based LLDPE, which has comparable properties to 1-octene based LLDPE, has been developed. See U.S. Pat. No. 6,171,993. Usually, when conventional HDPE and LLDPE are blended, the blend does not synchronize the performance of the components.

Suitable LLDPE for the use in the invention has a density within the range of about 0.90 to about 0.93 g/cc and an $MI_2$ within the range of about 0.5 to about 50 dg/min. Preferably, the LLDPE is a high performance, 1-hexene based.

Suitable HMW-HDPE for the use in the invention preferably has a density in the range of about 0.95 to 0.97 g/cc. More preferably, the density ranges from about 0.95 to 0.96 g/cc. Suitable HMW-MDPE for the use in the invention preferably has a density in the range of about 0.93 to 0.95 g/cc. Most preferably, the density ranges from about 0.93 to 0.94 g/cc.

HMW-HDPE and HMW-MDPE preferably have a melt index $MI_2$ in the range of about 0.02 to about 5 dg/min. The $MI_2$ is measured according to the ASTM D-1238. More preferably, $MI_2$ ranges from about 0.02 to about 1 dg/min. Most preferably, $MI_2$ ranges from about 0.03 to about 0.1 dg/min.

Suitable HMW-HDPE includes copolymers of ethylene with $C_{2-10}$ $\alpha$-olefins. Preferred $\alpha$-olefins are selected from the group consisting of 1-butene, 1-pentene, 4-methyl-1-pentene, 1-hexene, and 1-octene. The $\alpha$-olefins usually are present in the copolymer in the range of up to about 2 moles/mole of copolymer.

HMW-HDPE can be made by any known processes, including gas phase, fluidized bed, slurry and solution processes. Catalysts used for polymerization can be the traditional Ziegler or the single-site catalysts.

Preferably, the HMW-MDPE has a multimodal molecular weight distribution. By "multimodal molecular weight distribution," we mean not only that the HMW-MDPE has at least two different molecular weight components, but also that the two components differ chemically and structurally from each other. The low molecular weight component preferably has an $MI_2$ within the range of about 50 to about 600 dg/min. The high molecular weight component preferably has an $MI_2$ less than about 0.5 dg/min. The high molecular weight (i.e., low $MI_2$) component gives the polyethylene superior bubble stability in a blown film process and the low molecular weight (high $MI_2$) component gives the polyethylene excellent processability. Furthermore, the low molecular weight component has a density from about 0.94 to about 0.97 g/cc (i.e., in the range of conventional HDPE), while the high molecular weight component preferably has a density from 0.90 to 0.94 g/cc, more preferably from 0.91 to 0.94 g/cc, which is similar to the conventional LLDPE.

The blend has an LLDPE/HMW-HDPE of 50/50 or greater by weight. Preferably, the ratio is 60/40 or greater. Most preferably, the ratio is 70/30 or greater. While it is generally known that blending LLDPE with HDPE can increase the tear strength of the HDPE films, a thin film cannot be made from an LLDPE-rich blend on a high stalk film line because of the poor bubble stability of the blend.

Optionally, the blend contains antioxidants, UV-absorbents, flow agents, or other additives. The additives are well known in the art. For example, U.S. Pat. Nos. 4,086,204, 4,331,586 and 4,812,500, the teachings of which are herein incorporated by reference, teach UV stabilizers for polyolefin. Additives are added in an amount preferably less than 10 wt % of the total blend.

The extrusion of the blend is done on high stalk, groove feed extruder. The extrusion temperature is preferably within the range of about 385 F (196° C.) to about 450 F (233° C.). The thickness of the film is preferably within the range of about 0.25 to about 1 mil, more preferably within the range of about 0.3 to about 0.75 mil.

The invention includes thin films made from the blends. One advantage of the invention is that the FIOD allows the LLDPE-rich blends to process on high stalk film equipment that are used for HMW-HDPE or HMW-MDPE resins. For typical HDPE or MDPE resins, lowering the density may reduce the bubble stability on a high stalk film line. In spite of the lowered density of the blends, we have found that the FIOD helps the blends to maintain excellent bubble stabilities on a high stalk extrusion line. Another advantage of the invention is that the thin film made from the blends exhibits superior total tear properties compared to conventional HDPE or MDPE films. With the lowered density, the blend films feel softer than the conventional HDPE or MDPE films. Yet the films have much better tensile strength than that produced from LLDPE resins, resulting in good handle and yield strength in bags.

Preferably, the thin film has a machine-direction tear (MD) 18 grams or greater. More preferably, MD is 40 grams or greater. Most preferably, MD is 50 grams or greater.

The thin films can be oriented. Methods for polyethylene film orientation are known. For example, U.S. Pat. No. 5,962,598, the teachings of which are herein incorporated by reference, teaches how to produce biaxially oriented films made in high stalk extrusion. In the process, polyethylene melt is fed by an extruder through a die gap (0.8 to 2 mm) in an annular die to produce a molten tube that is pushed vertically upward. At this point, the molten tube is approximately the same size as the annular die. Pressurized air is fed to the interior of the tube to increase the tube diameter to give a "bubble." The volume of air injected into the tube controls the size of the tube or the resulting blow-up ratio. In high stalk extrusion, the increase in the tube diameter occurs at a height of approximately 5–12 times the die diameter. This distance is referred to as the stalk or neck height. The expanded tube produces the desired biaxial orientation of the film that results in the balance of tear and impact properties. The tube is rapidly cooled by chilled air on the outside surface of the film. The bubble is collapsed between a pair of nip rollers and wound onto a film roll by the film winder. Collapsing of the tube is done after initial cooling at a point so that the wall surfaces will not adhere to one another. Mechanical strength of the film is defined in two directions, along the polymer flow exiting the die or machine direction (MD) and perpendicular to the polymer flow exiting the die or transverse direction (TD).

The following examples merely illustrate the invention. Those skilled in the art will recognize many variations that are within the spirit of the invention and scope of the claims.

EXAMPLE 1

Preparation of HMW-MDPE

A catalyst is prepared according to U.S. Pat. No. 4,464,518. The catalyst is dispersed in hexane to yield catalyst slurry that contains about 1.4 wt % of solids. The catalyst slurry (0.059 parts per hour), triethyl aluminum co-catalyst (0.0033 parts per hour), hexane (41.0 parts per hour), 1-butene (0.37 parts per hour) and ethylene (16.9 parts per hour) are continuously fed into a first reactor. The reactor pressure is controlled at about 140 psig, the temperature at 82° C., and the molar ratio of hydrogen to ethylene in the vapor space at about 3.8 to give a first polymer. The first polymer has a $MI_2$ of 220 dg/min and a density of 0.95 g/cc.

The first polymer is transferred to a flash drum, where portions of the volatile materials are removed. The mixture is then transferred to a second reactor. Hexane (42.9 parts per hour), 1-butene (1.23 parts per hour) and ethylene (18.6 parts per hour) are continuously fed into the second reactor. The reactor temperature is maintained at 77° C., and the molar ratio of hydrogen to ethylene in the vapor space at about 0.05 to give a new polymer that has an $MI_2$ of about 0.08 dg/min and a density of 0.94 g/cc.

The second polymer is isolated and dried under nitrogen. The dried powder is then compounded in the presence of 5% oxygen in the presence of a suitable stabilization package to give a polyethylene having an $MI_2$ of 0.05 dg/min, MFR of 145, and density of 0.94 g/cc.

The resulting polyethylene is converted into a film with a thickness of 0.5 mil on a blown film line with a 60 mm grooved feed extruder at screw speed of 72 rpm. The extruder is equipped with a 120-mm monolayer die equipped with the FIOD and has a 1.2 mm die gap. The film is produced at a stalk height of six die diameters and at a blow up ratio (BUR) of 4.1. The film has a bubble stability rating 44, machine direction tear strength (MD tear) 10.4 g and transverse direction tear strength (TD tear) 98 g.

EXAMPLE 2

Blend having LLDPE/HMW-HDPE Weight Ratio of 80/20

The HMW-MDPE prepared in Example 1 is blended with a commercial LLDPE GS707, product of Equistar Chemical Company, in a weight ratio LLDPE/HMW-HDPE of 80/20. The LLDPE has a $MI_2$ 0.70 dg/min and density 0.92 g/cc. The LLDPE and HMW-MDPE resins are dry blended and fed into extruder. The blend has $MI_2$ 0.55 dg/min and density 0.923 g/cc. The resulting blend is processed on a grooved feed extruder equipped with the FIOD attached to a 120 mm die with a 1.2 mm die gap producing 0.5 mil film. The film is produced at a stalk height of six die diameters at a blow up ratio (BUR) of 4:1. The film has an MD tear of 85 g and TD tear of 356 g.

EXAMPLES 3–11

Various LLDPE/HMW-MDPE Blends

The procedure of Example 2 is repeated by varying the LLDPE/HMW-MDPE/ratio and the LLDPE used. The results are listed in Table 1, which show that both MD and TD tears increase with the increase in the ratio of LLDPE/HMW-HDPE. All of the blends show excellent bubble stability on the high stalk film line with FIOD.

EXAMPLES 12–16

Blends of HMW-HDPE and LLDPE

The general procedure of Example 2 is repeated by using HMW-HDPE, L5005 (product of Equistar Chemicals, LP). All of the blends show excellent bubble stability on the high stalk film line with FIOD.

COMPARATIVE EXAMPLE 17

Film Production Process without FIOD

The blend of Example 2 is processed on a traditional high stalk film line with no FIOD, thin films cannot be produced due to poor bubble stability.

TABLE 1

Films Tear Strength and Bubble Stability*

| Ex. N. | HMW-MDPE | HMW-HPDE | LLDPE | LLDPE/HMW-MDPE or LLDPE/HMW-HDPE | Bubble Stability | MD, g | TD, g |
|---|---|---|---|---|---|---|---|
| 2 | Ex. 1 | — | GS707 | 80/20 | 72 | 85 | 358 |
| 3 | Ex. 1 | — | GS707 | 70/30 | 72 | 51 | 312 |
| 4 | Ex. 1 | — | GS707 | 60/40 | 72 | 44 | 175 |
| 5 | Ex. 1 | — | GS707 | 50/50 | 72 | 18 | 137 |
| 6 | Ex. 1 | — | GA601 | 30/70 | 72 | 12 | 266 |
| 7 | Ex. 1 | — | Escorene ® 1001.3 | 30/70 | 72 | 12 | 251 |
| 8 | Ex. 1 | — | Rexell ® L8101 | 30/70 | 72 | 14 | 230 |
| 9 | Ex. 1 | — | GA601 | 70/30 | 72 | 49 | 303 |
| 10 | Ex. 1 | — | Escorene ® 1001.3 | 70/30 | 72 | 23 | 213 |
| 11 | Ex. 1 | — | Rexell ® L8101 | 70/30 | 72 | 55 | 341 |
| 12 | — | L5005 | GA601 | 10/90 | 72 | 11 | 89 |
| 13 | — | L5005 | GA601 | 20/80 | 72 | 13 | 111 |
| 14 | — | L5005 | GA601 | 30/70 | 72 | 12 | 156 |
| 15 | — | L5005 | GA501 | 10/90 | 72 | 13 | 62 |
| 16 | — | L5005 | GA501 | 20/80 | 72 | 10 | 105 |

*Escorene 1001.3 is a product of Exxon Mobil Chemical; Rexell L8101 is a product of Huntsman Polymers; the rest of the samples are products of Equistar Chemicals, LP.

We claim:

1. A process for preparing a thin film on a high stalk extrusion line, said process comprising:
   - (a) extruding a blend through an annular die to form a molten material tube, said blend comprising:
     - (i) a linear low density polyethylene (LLDPE) which has a density within the range of about 0.90 to about 0.93 g/cc and an $MI_2$ within the range of about 0.5 to about 50 dg/min; and
     - (ii) a high molecular weight high density polyethylene (HMW-HDPE) which has a density within the range of about 0.95 to about 0.97 g/cc and an $MI_2$ within the range of about 0.01 to about 0.5 dg/min;

in a weight ratio of (i)/(ii) greater than or equal to 50/50; and
   - (b) pulling the molten material tube around a flexible internal orientation device (FIOD) to form the film; wherein the film has a thickness of 0.5 mil or less.

2. The process of claim 1 wherein the weight ratio of (i)/(ii) is greater than or equal to 60/40.

3. The process of claim 1 wherein the weight ratio of (i)/(ii) is greater than or equal to 70/30.

4. The process of claim 1 wherein the film has a machine-direction tear of 18 grams or greater.

5. The process of claim 1 wherein the film has a machine-direction tear of 40 grams or greater.

6. A thin film produced by the process of claim 1.

7. The film of claim 6 wherein the LLDPE is a copolymer of ethylene with an alpha-olefin selected from the group consisting of propylene, 1-butene, 1-pentene, 1-hexene, 1-octene, 4-methyl-1-pentene, and mixtures thereof.

8. The film of claim 6 wherein the LLDPE is a copolymer of ethylene with 1-hexene.

9. The film of claim 6 wherein the film has a machine-direction tear of 18 grams or greater.

10. The film of claim 6 wherein the film has a machine-direction tear 40 grams or greater.

* * * * *